United States Patent [19]

Souissi et al.

[11] Patent Number: 5,809,059
[45] Date of Patent: Sep. 15, 1998

[54] METHOD AND APPARATUS FOR SPREAD SPECTRUM CHANNEL ASSIGNMENT

[75] Inventors: Slim Souissi, Fort Worth, Tex.; Samir A. Sawaya, San Diego, Calif.

[73] Assignee: Motorola, Inc., Schaumburg, Ill.

[21] Appl. No.: 752,819

[22] Filed: Nov. 21, 1996

[51] Int. Cl.⁶ .................................................. H04B 1/713
[52] U.S. Cl. ........................ 375/202; 375/227; 370/329; 370/437; 455/452; 455/513; 455/673
[58] Field of Search ..................................... 375/200, 202, 375/224, 227; 455/450, 452, 509, 512, 513, 524, 525, 67.3; 370/252, 329, 332, 337

[56] References Cited

U.S. PATENT DOCUMENTS

| | | | |
|---|---|---|---|
| 5,335,246 | 8/1994 | Yokev et al. | 375/200 |
| 5,343,494 | 8/1994 | Averst et al. | 375/200 |
| 5,394,433 | 2/1995 | Bantz et al. | 375/202 |
| 5,430,759 | 7/1995 | Yokev et al. | 375/202 |
| 5,541,954 | 7/1996 | Emi | 375/202 |
| 5,724,380 | 3/1998 | Ritter | 375/202 |

Primary Examiner—Don N. Vo
Assistant Examiner—Amanda T. Le
Attorney, Agent, or Firm—Charles W. Bethards; Pablo Meles

[57] ABSTRACT

A controller (152) in a frequency hopped spread spectrum system (100) operating to assign a best available frequency hopping sequence among a plurality of sequences to at least one of a plurality of subscriber units (156) having predefined transmission intervals (12) and predefined transition intervals (14) comprises a power detector (50) that estimates a combination of a noise level and an interference level by measuring signal strength during a series of transition intervals for at least one sequence of channels among the plurality of sequences and a processor that computes an average noise and interference level for the at least one sequence of channels and ranks the at least one sequence of channels in accordance with the average noise and interference level computed.

24 Claims, 4 Drawing Sheets

METHOD AND APPARATUS FOR SPREAD SPECTRUM CHANNEL ASSIGNMENT

FIELD OF THE INVENTION

This invention relates in general to spread spectrum communications and more specifically to optimal channel assignment in a spread spectrum system.

BACKGROUND OF THE INVENTION

The desire for two way paging is evident from the high prices paid by major communication companies for Personal Communications Services (PCS) frequencies at government auctions. Unfortunately, many of the less funded communication companies were left without spectrum to build out a conventional two-way paging system. Thus, a need exists for a two-way communication solution for owners of one-way spectrum. For instance, some one-way paging service providers that use Motorola's FLEX™ protocol and do not own inbound spectrum for instance are interested in using spread spectrum technology for inbound paging over free and unlicensed bands such as the ISM band. The present invention can be used in an overlay inbound paging system (spread spectrum or others) on top of FLEX™ or other outbound protocol or alternatively, the present invention can be used in a two-way system designed from the ground up. The present invention further opens the door to FLEX™ or other one-way protocols to enter the two-way market with a more robust system than previously available.

Unfortunately, the ISM band is a noisy environment that may become unreliable as the ISM band gets crowded with more and more users. Therefore channel assignment methods must be based on the level of interference within the channel. The present invention suggests a method of optimal channel assignment in a spread spectrum system operating over the ISM band.

In order to assign the best channel to a given subscriber unit in a 2-way paging system that uses frequency hopping for the inbound channel, an accurate signal-to-noise (SNR) measurement must be performed. There are several existing ways to measure the SNR within a hopping channel for frequency hopped spread spectrum (FHSS) systems:

ΣMethod 1: First, evaluate the signal strength immediately before FHSS-signal transmission $P_1=P_N$ ($P_N$ denotes the noise power). Then evaluate total signal strength during FHSS-signal transmission $P_2=(P_S+P_N)$ ($P_S$ denotes the received signal power). The SNR within the hopping channel is equal to $(P_2-P_1)/P_1$.

The problem with this method is that it assumes that during the first measurement, only noise (thermal+ interference) is present. This is not always the case especially when the system gets heavily loaded. For instance, another "friendly" user may have been sending data while the noise measurement is being performed, thereby unnecessarily increasing the noise reading and subsequently lowering the respective SNR calculated. The present invention alleviates the problem by keeping the receiver aware of the presence of friendly users. In which case noise measurements are performed only during the absence of friendly users. Even if a scheme exist that keeps the receiver aware of friendly users, the receiver may have to wait for a long period of time before the channel gets idle during high traffic loads. This will affect the reliability of the measurement since old data will be used in SNR estimations.

ΣMethod 2: Decode the signal completely, then feedback the decoded signal (desired signal) and subtract it from the received signal. This gives an estimate of noise as well as desired signal. SNR evaluation is straightforward after that. The problem with this method is that it works only when the desired signal is strong enough to be decoded reliably. It also requires memory space to store received and decoded signal. As in the case of method 1, method 2 also has the disadvantage of measuring a "friendly" user's signal as noise. Thus, the present invention overcomes the problems described in methods 1 and 2 above and provides further benefit that will be described in further detail.

SUMMARY OF THE INVENTION

In a first aspect of the present invention, a method for assigning a sequence of channels among a plurality of sequences in a spread spectrum communication system to at least one of a plurality of subscriber units having predefined transmission intervals and predefined transition intervals comprises the steps of estimating a combination of a noise level and an interference level by measuring a signal strength during a series of transition intervals for at least one sequence of channels among the plurality of sequences and computing an average noise and interference level for the at least one sequence of channels. Then the method selects the at least one sequence of channels having the lowest average noise and interference level for a next transmission of information in the spread spectrum communication system.

In another aspect of the present invention, a controller in a frequency hopped spread spectrum system operating to assign a best available frequency hopping sequence in a spread spectrum communication system having predefined transmission intervals and predefined transition intervals comprises an input that receives measurements taken at a base receiver that estimates a combination of a noise level and an interference level by measuring signal strength during a series of transition intervals for at least one sequence of channels among the plurality of sequences and a processor that computes an average noise and interference level for the at least one sequence of channels and ranks the at least one sequence of channels in accordance with the average noise and interference level computed.

In yet another aspect of the present invention, a base receiver in a frequency hopped spread spectrum system operating to assign a best available frequency hopping sequence among a plurality of sequences to at least one of a plurality of subscriber units in a spread spectrum communication system having predefined transmission intervals and predefined transition intervals comprises a power detector that estimates a combination of a noise level and an interference level by measuring signal strength during a series of transition intervals for at least one sequence of channels among the plurality of sequences and a processor that computes an average noise and interference level for the at least one sequence of channels and chooses the at least one sequence of channels having a lowest average noise and interference level for a next transmission of information in the spread spectrum communication system.

DETAILED DESCRIPTION

The present invention describes a method for assigning frequency hopping patterns to a population of subscriber units operating over the ISM band and preferably using FH spread spectrum modulation for multiple access, although other spread spectrum schemes are contemplated within the present invention. The method of assignment relies on accurate noise and interference measurements and is further refined with accurate SNR measurements. Different hopping sequences can be assigned a reliability number based on the total amount of noise they experience. A controller preferably attempts to assign to each subscriber unit a hopping sequence that is within a base receiver's sensitivity limit.

Figure 1:
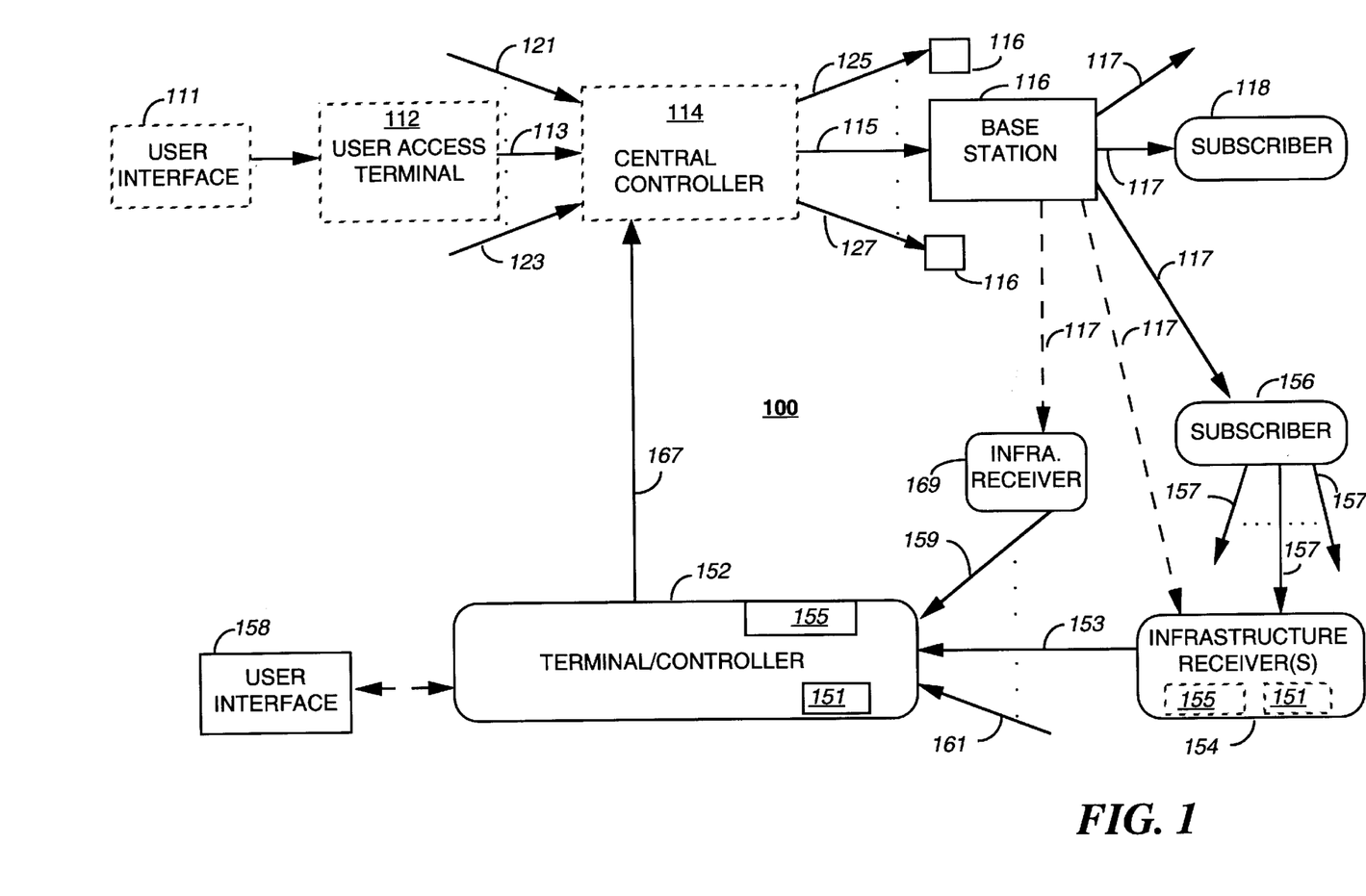
FIG. 1 illustrates a system block diagram of a spread spectrum system in accordance with an embodiment of the present invention.

Referring to FIG. 1, a block diagram for a spread spectrum system 100 is shown in accordance with the present invention. The present invention could be designed as either an overlay system to a traditional outbound one-way only paging system or be designed from the ground up as a two-way paging system. In either case, the system 100 preferably comprises a user interface 111 which can simply be a conventional phone or preferably an alphanumeric entry device such as Motorola's Alphamate® alpha entry device or a computer having software allowing for a modem or an internet connection to a paging terminal such as the user access terminal 112. The user access terminal could be a paging terminal such as Motorola's Wireless Message Gateway™ terminals in an overlay design. Messages and data received at the user access terminal 112 are preferably forwarded via link 113 and encoded, queued and batched at a controller 114. The controller is preferably Motorola's RF-Conductor!™ messaging controller in an overlay system. Alternatively, these functions of encoding, queuing and batching or portions of these functions can be done in separate units or within a paging terminal such as the user access terminal 112. Additionally, the controller can receive data or messages from other sources (121 and 123). Once the functions of queuing and batching are done, the messages can be forwarded to one or more base station transmitters (116) over a plurality of links (115, 125 and/or 127). The base stations are preferably Motorola's Nucleus® or RF-Orchestra!™ transmitters. The base station transmitter 116 can then transmit a selective call message over an RF outbound path 117 to a plurality of subscriber units (118 and 156). The subscriber unit 118 can be a typical one way unit as general known and the subscriber unit 156 is preferably a two way unit as used in the present invention.

The subscriber unit 156 preferably has receive and transmit capabilities and preferably its operation will differ from existing two way systems in what it expects to receive from the one way only infrastructure, and the different means for delivering two way control data. In other words, the formatting, location, and vehicles used to route control data found in an existing one-way outbound system could be changed so that the overlay system is accommodated without affecting the existing one-way system. For instance, control data typically only found in a header can be imbedded in the message portion of an outbound paging transmission. Some of these issues would not be a concern in a two-way system designed from the ground up. In any event, the subscriber unit 156 preferably uses an RF inbound link 157 to transmit to an infrastructure or base receiver 154 or a plurality of base receivers (not shown). The subscriber unit 156 can use a variety of modulation techniques for transmitting its inbound signals (i.e., acknowledgment signals, canned responses, etc.) including spread spectrum techniques. This base receiver 154 may be the same as those used in non-overlay two way messaging systems such as Motorola's RF-Audience!™ base receivers and should be able to decode the modulation technique used by the subscriber unit, but it does need not be aware of whether this is an overlay or a complete two way system. The base receiver 154 is preferably linked to an overlay user access terminal/controller 152 which will provide reconciliation of inbound and outbound messages among other things. Optionally, the base receiver 154 could have two receivers within the same unit to decode both the inbound messages from the subscriber unit as well as the outbound messages coming from one-way outbound paging system. Alternatively or in addition to the base receiver 154, a separate base receiver 169 could be used as a monitor receiver for directly receiving and decoding outbound messages to further add to the integrity of the system 100. Thus, inbound messages from the subscriber unit 156 will be correctly correlated with the outbound messages from the paging system. The base receivers that directly receive and decode the outbound messages from the paging system are particularly useful in cases where the messages did not originate from the terminal/controller 152 or the inbound overlay system, but from the user interface 111 for instance. In a two-way system designed from the ground up, cost savings could be found by eliminating the user interface 111, user access terminal 112, and central controller 114 and using the terminal/controller 152 to couple to the base station transmitters 116 directly.

Callers accessing two way devices such as subscriber unit 156 can reach the terminal/controller 152 via a plurality of RF inbound links (153, 159, 161). Alternatively, like the one way user access terminal 112, another user interface 158 such as a computer with alpha entry paging software can be linked to the terminal/controller 152. The user interface 158 could be used among other things to modify subscriber lists, modify class of service for a particular subscriber, or initiate a page through the terminal/controller 152. Initiating an outbound page through the terminal/controller 152 would require a link 167 to the controller 114 of the outbound paging system, unless the terminal/controller 152 was directly coupled to the base station transmitters in a two-way system designed from the ground up. The link used would depend on the configuration of the service provider's system. The terminal/controller 152 is cognizant of the two way operations and would have access to a data base in memory 155 (or elsewhere) and processor(s) 151 necessary to properly signal the subscriber units. In the present invention, signals received from the subscriber units are processed and acted on accordingly in assigning the appropriate or best channel sequence and/or data or code rate. The processing to derive the best channel sequence and/or data or code rate can be done within the terminal/controller 152 with processor 151 and memory 155 or alternatively within the base receiver 154 having the same components (shown in phantom lines).

Additionally, a two-way system, including this overlay system can allow for roaming of subscriber units among different paging systems. Thus, an intraterminal link (not shown) could be coupled to the terminal/controller 152 as well as to a remote terminal (not shown) from another system and would facilitate the forwarding of messages and location finding of roaming subscriber units. The remote terminal can also be another terminal/controller like terminal/controller 152.

The means for interconnecting the various blocks are numerous. In general they will be driven by the service provider's existing data networks, the availability within the regions of service, and the costs of the available means. Co-location of the parts, although often a cost advantage, is not necessary to the effective operation as long as the latencies are not severe and the bandwidth adequate for existing traffic.

Ideally, the controller or a controller system in accordance with the present invention in a frequency hopped spread spectrum system operating to assign a best available frequency hopping sequence among a plurality of sequences to at least one of a plurality of subscriber units in a spread spectrum communication system having predefined transmission intervals and predefined transition intervals comprises an input that receives measurements taken at a base receiver such as base receiver 154 that estimates a combination of a noise level and an interference level by measuring signal strength during a series of transition intervals for at least one sequence of channels among the plurality of sequences. The controller system will also preferably comprise a processor that computes an average noise and interference level for the at least one sequence of channels and ranks the at least one sequence of channels in accordance with the average noise and interference level computed. The processor may additionally choose a best available sequence of channels with the lowest average noise and interference level among the ranked sequence of channels for use in the next transmission of information in the spread spectrum communication system. Operationally, the power detector preferably estimates a combination of a signal, a noise and an interference level by measuring signal strength during a series of transmission intervals of the signal for the at least one sequence of channels among the plurality of sequences and where the processor further estimates a signal to noise ratio by correspondingly subtracting the signal strength measurement taken during the transition interval from the signal strength measurement taken during the transmission measurement and dividing the result of such subtraction by the signal strength measurement from the transition interval. Thus, using the SNR, the processor can further choose an optimized code rate and data rate for scheduled transmissions from the at least one of a plurality of subscriber units to the frequency hopped spread spectrum system based on the signal to noise ratio estimation.

The "controller" as described could reside within a separate controller box, reside within a base receiver or reside within a messaging terminal as described in FIG. 1. Thus, a "controller system" in a frequency hopped spread spectrum system operating to assign a best available frequency hopping sequence among a plurality of sequences to at least one of a plurality of subscriber units in a spread spectrum communication system having predefined transmission intervals and predefined transition intervals comprises a base receiver having a power detector that estimates a combination of a noise level and an interference level by measuring signal strength during a series of transition intervals for at least one sequence of channels among the plurality of sequences and a processor that computes an average noise and interference level for the at least one sequence of channels and ranks the at least one sequence of channels in accordance with the average noise and interference level computed. Otherwise the "controller system" operates as the "controller" previously described. One ordinarily skilled in the art should appreciate that the functions described may be shared or apportioned among several components in the system an still be contemplated within the scope and spirit of the present invention as claimed.

Thus, a base receiver in a frequency hopped spread spectrum system operating to assign a best available frequency hopping sequence among a plurality of sequences to at least one of a plurality of subscriber units in a spread spectrum communication system having predefined transmission intervals and predefined transition intervals could preferably comprise a power detector that estimates a combination of a noise level and an interference level by measuring signal strength during a series of transition intervals for at least one sequence of channels among the plurality of sequences and a processor that computes an average noise and interference level for the at least one sequence of channels and chooses the at least one sequence of channels having the lowest average noise and interference level for the next transmission of information in the spread spectrum communication system. Again, the "base receiver" otherwise operates as the "controller system" previously described.

Figure 2:
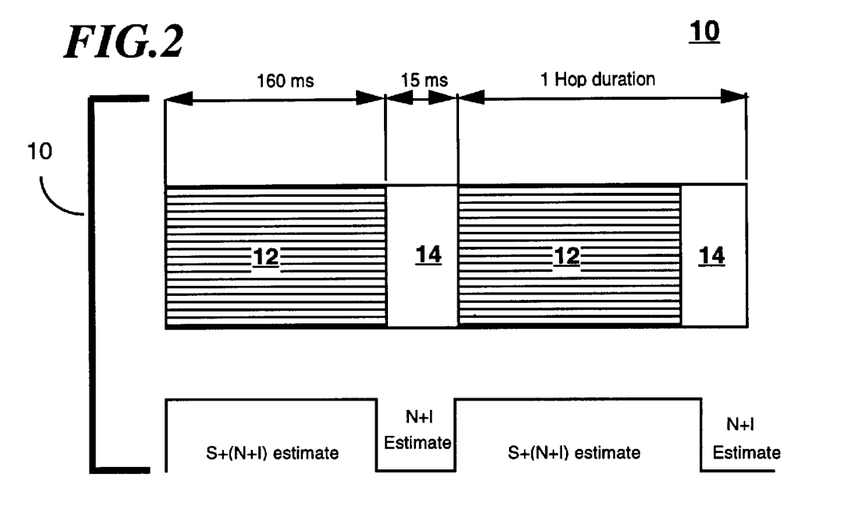
FIG. 2 is a timing diagram illustrating the intervals used for calculating average noise and SNR in accordance with the present invention.

Referring to FIG. 2, there is shown a timing diagram 10 in accordance with the present invention. The present invention also illustrates a new method for SNR measurement preferably for use in a frequency hopping spread spectrum system. The method preferably takes advantage of the transition time or interval 14 between consecutive hops to measure signal strength. Since all users in such a system must be silent during the transition time, the only signal present represents noise and interference (N+I). FIG. 2 can illustrate the measurement method for a typical frequency hopping spread spectrum system. During the transmission interval 12 or period (160 ms), the receiver estimates the signal power $P_1$. $P_1=(P_S+P_N)$ ($P_S$ denotes the desired signal power and $P_N$ denotes the total noise power which includes interference noise and thermal noise). During the transition period (15 ms) the receiver measures the signal power $P_2=P_N$. The SNR is computed as $(P_1-P_2)/P_2$. For every hopping channel an SNR estimate is made. Let $SNR_i$ denote the signal to noise plus interference ratio for a given hopping channel $ch_i$. The average SNR that a given inbound message would experience when going through several hops is given by the sum of all $SNR_i$ where $ch_i \in \{$set of hopping channels that the message went through$\}$.

The controller or base receiver (such as terminal/controller 152 or base receiver 154) would preferably performs two types of measurements:

First, estimate the average noise within a sequence of hopping channels. This estimate can be used to assign the best available hopping sequence to a given subscriber unit that is trying to initiate a scheduled transmission. Secondly, estimate the received average SNR for a given scheduled unsolicited (ALOHA) transmission from a subscriber unit. This allows the terminal/controller 152 to schedule the inbound transmission at the optimum data rate, code rate, and using the best available frequency hopping sequence.

After, the decoding of an inbound ALOHA packet, the base receiver 154 has knowledge of S (desired signal strength) as well as (noise+interference power per hopping sequence). The controller/terminal 152 preferably uses the S value and the (I+N) values associated with each hopping sequence to determine the best frequency hopping sequence for use during the scheduled transmission.

A typical example is shown below:

| | |
|---|---|
| Aloha Packet Signal strength | 17 dB |
| FH sequence 1 avg. (N + I) | 8 dB |

-continued

| | |
|---|---|
| FH sequence 2 avg. (N + I) | 6 dB |
| Scheduled msg SNR for FH1 | 9 dB |
| Scheduled msg SNR for FH2 | 11 dB | a. The Aloha packet signal strength is measured (17 dB) (no noise included).

b. The N+I value for FH sequence 1 is available (8 dB)

c. The receiver estimates the S/(N+I) for FH sequence 1 to be 9 dB while the SNR for FH sequence 2 is estimated to be 11 dB. This means that if the terminal/controller schedules the message to use FH1, the SNR of the message would be 17 dB−8 dB=9 dB. The controller should assign the optimum data rate and code rate that satisfies this SNR requirements. Thus, the example shows the FH sequence 2 provides a better SNR value. The controller has the choice to use FH sequence 2 at a higher data rate & higher code rate or use FH1 at a lower data rate & lower code rate.

Figure 3:
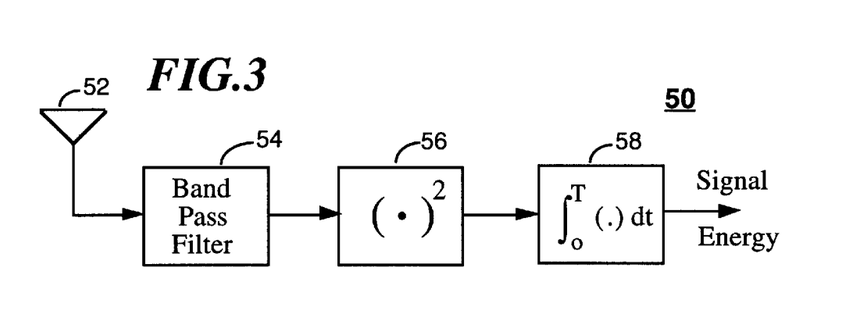
FIG. 3 is an energy detector in accordance with an embodiment of the present invention.

In order to measure the energy within a hopping channel a radiometer 50 as shown in FIG. 3 is preferably used. This energy detector consists of an antenna 54, a bandpass filter 54 (BPF) of center frequency $f_o$ and bandwidth W and a square law operation 56 followed by a T-second integrator 58. The filter bandwidth should be equal the hopping channel bandwidth. The integrator is reset at the end of each successive T-second period. T takes alternatively the values 160 ms and 15 ms in the example above to measure $P_1=(P_S+P_N)$ and $P_2=P_N$ respectively. Alternatively, the energy within the hopping channels can be measured based on a Fast Fourier Transform (FFT) of the received spectrum.

For each hopping pattern, the controller determines a metric which is proportional to the noise that the inbound packet would experience if it uses the selected FH pattern. The metric could be the total amount of noise observed in each of the hopping channels the subscriber would use. Or this metric could be the sum of SNR's of all hopping channels that belong to the given hopping pattern. Preferably, the controller can rank the hopping patterns based on the specific metric. When assigning FH sequences for scheduled transmissions, the controller preferably uses the FH sequences listed in the increasing order (from best sequence to worst sequence).

Figure 4:
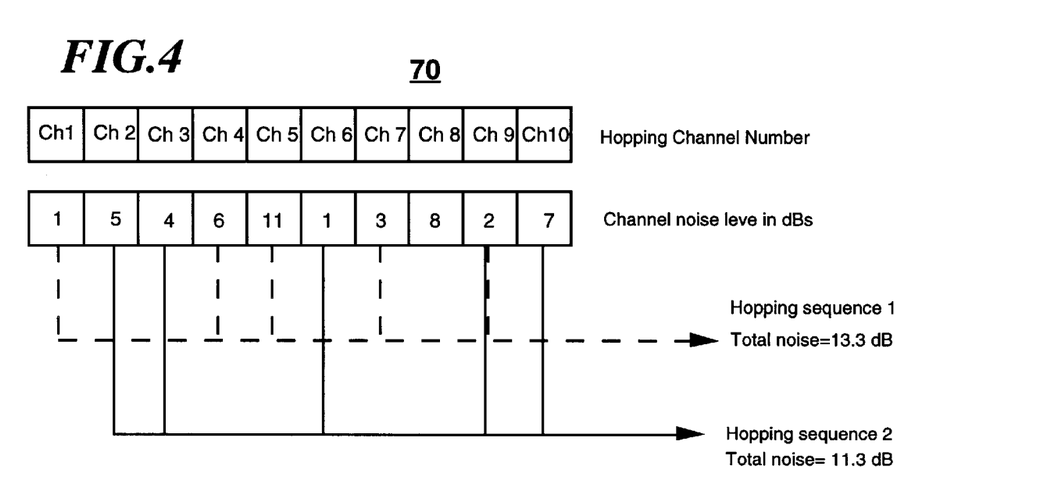
FIG. 4 is a block diagram illustrating two frequency hopping sequences and average noise calculations in accordance with the present invention.

The next example shown in FIG. 4 illustrates the method 70 of computing the average noise observed by two different hopping sequences each using 5 hopping channels. In FH sequence 1, the average noise experienced over the sequence is 13.3 dB while the average noise experienced over FH sequence 2 is 11.3 dB. From this information alone, the controller would preferably use FH sequence 2.

Figure 5:
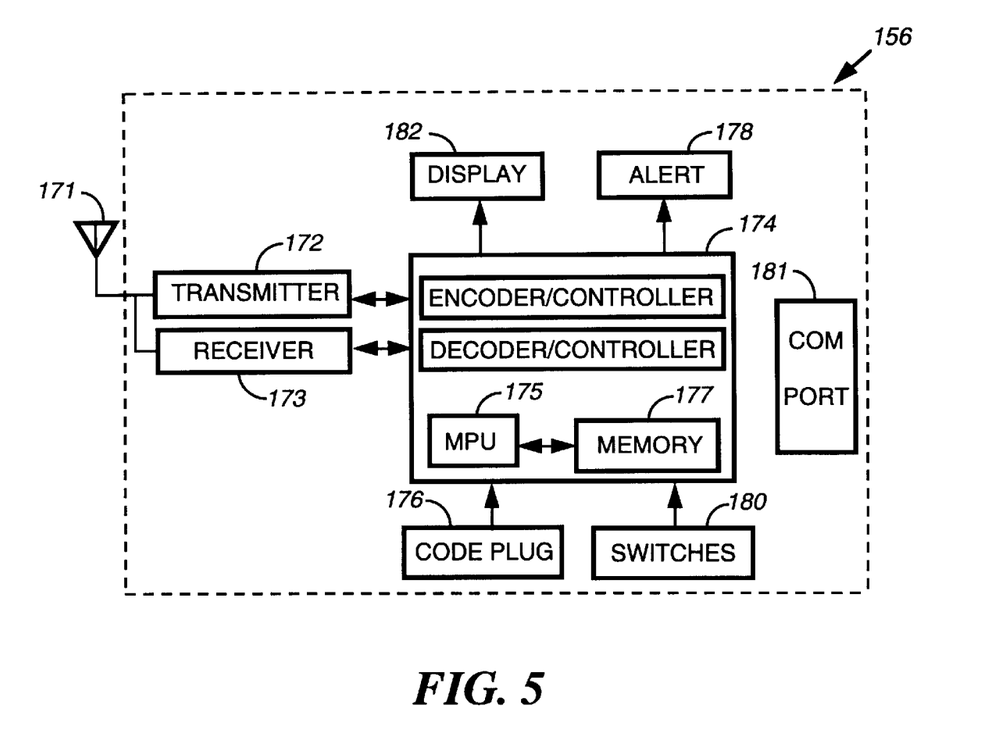
FIG. 5 is a block diagram of a subscriber unit in accordance with the present invention.

Referring to FIG. 5, a selective call transceiver 156 which can preferably operate as one-way selective call receiver in a one-way coverage zone or as selective call transceiver in a two-way coverage zone is shown. Preferably the transceiver 156 comprises a selective call receiver 173 coupled to a decoder and a controller (174) and a selective call transmitter 172 coupled to the controller and an encoder (174). The transceiver 170 preferably further comprises a memory 177 and a code plug 176 coupled to the controller 174. The selective call transceiver can further comprise a display 182 such a liquid crystal display or a tactile or audible alert 178 such as a transducer or vibrator motor.

The device 156 includes an antenna 171 for intercepting transmitted RF signals and for transmitting RF signals via a transmitter 172. The antenna 171 couples a received signal to a receiver 173, the receiver 173 and the transmitter 172 forming a transceiver. The transceiver produces a data stream representative of a demodulated received signal coupled to a decoder/controller 174. The transceiver (172, 173) is also responsive to a modulation input such as data received from the decoder/controller 174 to frequency modulate a carrier signal for transmission out from the device 156. As is well known in the art, the decoder/controller 174 may include a central processing unit such as a microprocessor 175 or the like for processing demodulated signal information in accordance with the software stored in a memory 177 of the decoder/controller 174. The decoder/controller 174 is also responsive to inputs from one or more switches 180 or other input devices to generate data that is coupled to the transceiver (172, 173) for transmission out from the device 156. The RF signals transmitted by the transmitter units of a paging system typically include control information containing an address that identifies a particular device 156. In a typical one-way system, page message information follows the control information. The decoder/controller 174 decodes a received address by comparing it with one or more addresses stored in a code plug or code memory 176. If the decoder/controller 174 detects a match between a received address and a stored address, an alert signal may be generated by a device 178 so as to alert a user that a message has been received by the device 156. The alert signal may be an audible and/or tactile alert such as a silent vibrating alert. It is noted that if the RF signals only contain control information and no user viewable message, an alert need not be generated upon an address match. The switches 180 may be actuated by a user to select between the types of alerts as well as for inputting information to the memory 177 and causing a message stored in the memory of the decoder/controller 174 to be accessed for display on a display 182. The switches 180 may also provide additional functions such as reset, read, delete, etc. as is known or generate two-way functions or respond to messages. The device 156 may also include a conventional communication port 81 for hardwire connection to a wired subsystem as well.

The selective call transceiver unit 156 can use an inbound channel overlay on an outbound selective call system for creating a two way selective call system or otherwise be fully integrated into a two-way selective system. The selective call transceiver unit 156 preferably comprises a receiver 173 as described above for preferably receiving a address and a message further having a control information portion that would preferably characterizing how the inbound channel should operate for the selective call transceiver unit. The unit 156 further comprises a transmitter 172 for transmitting information in accordance with the control information portion. The control information within context of the present invention could include selection of frequency hopping channels and selection of data or code rates for transmission on the inbound channels.

Figure 6:
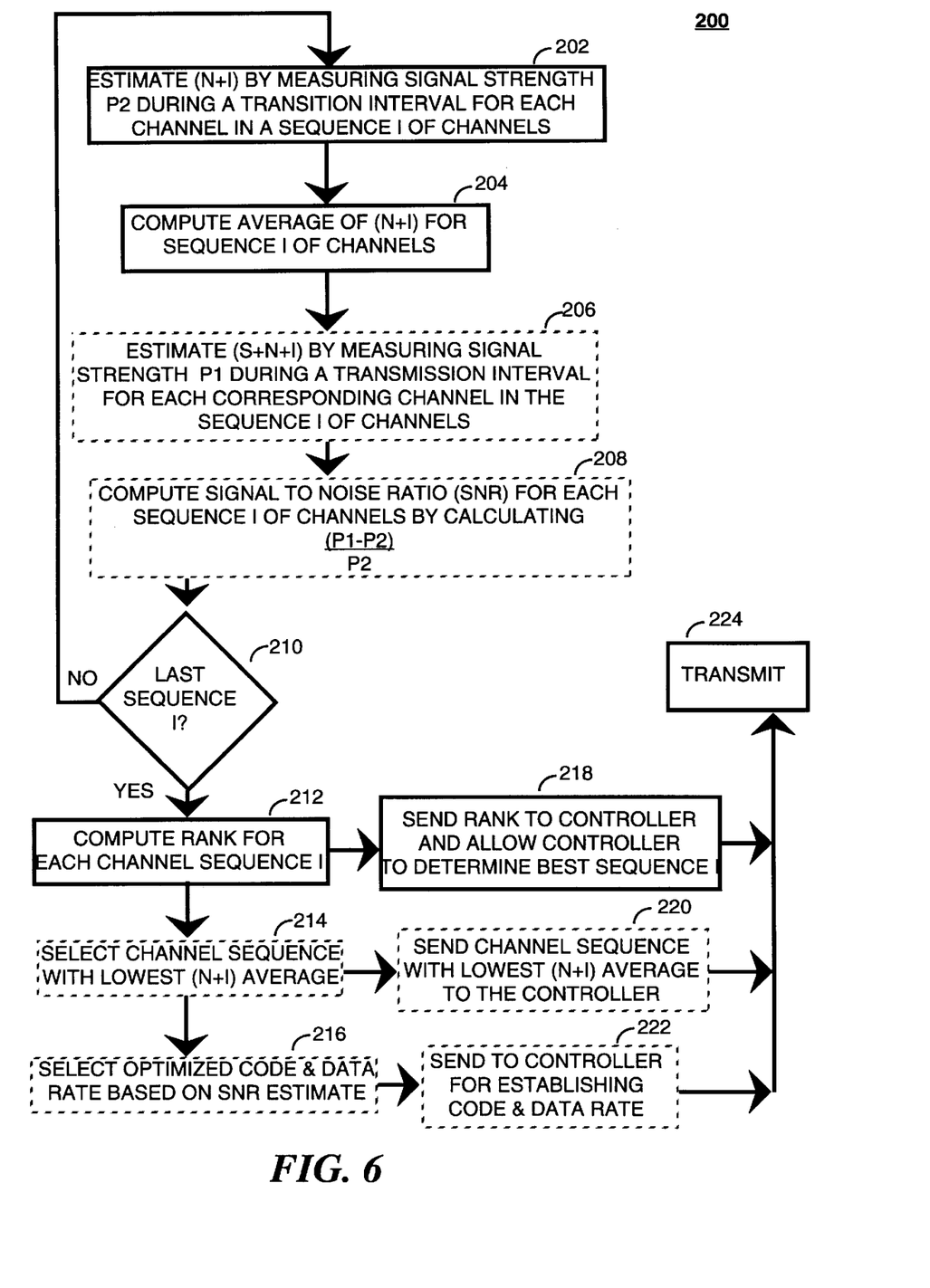
FIG. 6 is a flow chart illustrating a method in accordance with an embodiment of the present invention.

Referring to FIG. 6, there is shown a method 200 for assigning a sequence of channels and alternatively or additionally assigning a code or data rate in a spread spectrum system in accordance with the present invention. At block 202, a processor either at a base receiver or a controller will preferably estimate a noise and interference (N+I) level by measuring a signal strength (P2) during a transition interval for each channel in a sequence i of channels. At block 204, an average noise and interference level is computed for the sequence i of channels. In the case where an optimized code or data rate is desired, then at block 206, a signal plus noise and interference (S+N+I) level is estimated by measuring the signal strength (P1) during a transmission interval for each channel in the sequence I of channels. At block 208, the SNR for each sequence i of channels is computed by subtracting the signal strength measured during the transition intervals (P2) from the signal strength measured during the transmission intervals (P1) and then dividing the result by the signal strength measured during the transition intervals. If all available sequences are not processed at decision block 210, the method returns to block 202. If all sequences were processed, then the method computes the rank for each channel sequence i at block 212 and proceeds to send the rank to the controller to allow the controller to determine the best sequence at block 218. Alternatively, the channel sequence with the lowest average noise and interference is selected at block 214 and then forwarded to the controller at step 220. In another alternative, the best or optimized code or data rate for inbound transmissions is selected based on the previously estimated SNR calculations at block 216 and forwarded to the controller at block 222. In any event, the transmission of the message will ideally be sent at block 224 using the available sequence of channels having the least amount of interference with the optimized code and data rate determined from the SNR calculations.

The present invention could be applied in many areas including wireless links and networks operating in the ISM bands, future paging networks operating on the ISM band, personal location and messaging units, vehicle location control and messaging as well as local area networks using the ISM band. It should be understood that the disclosed embodiments are merely examples and the invention is not restricted thereto. It should be further understood by those skilled in the art that variations and modifications can be made without deviating from the scope and spirit of the present invention defined by the appended claims.

What is claimed is:

1. A method for assigning a sequence of channels among a plurality of sequences in a spread spectrum communication system to at least one of a plurality of subscriber units having predefined transmission intervals and predefined transition intervals, comprising the steps of:

estimating a combination of a noise level and an interference level by measuring a signal strength during a series of transition intervals for at least one sequence of channels among the plurality of sequences;

computing an average noise and interference level for the at least one sequence of channels; and selecting the at least one sequence of channels having the lowest average noise and interference level for a next transmission of information in the spread spectrum communication system.

2. The method of claim 1, wherein the method further comprises the step of estimating a combination of a signal, a noise and an interference level by measuring signal strength during a series of transmission intervals of the signal for the at least one sequence of channels among the plurality of sequences.

3. The method of claim 2, wherein the method further comprises the step of estimating a signal to noise ratio by correspondingly subtracting the signal strength measured during each of the series of transition intervals from the signal strength measured during each of the series of transmission intervals and dividing a result of such subtraction by the signal strength measurement from each of the series of transition intervals.

4. The method of claim 3, wherein the method further comprises the step of optimizing a code rate and a data rate of scheduled transmissions from the at least one of a plurality of subscriber units to the spread spectrum communication system using the signal to noise ratio estimation.

5. A method at a controller for assigning an optimum data rate and code rate for a particular frequency hopping sequence to at least one of a plurality of subscriber units in a spread spectrum communication system having predefined transmission intervals and predefined transition intervals, comprising the steps of:

estimating a combination of a noise level and an interference level by measuring signal strength during a series of transition intervals for at least one sequence of channels among a plurality of sequences;

estimating a combination of a signal, a noise and an interference level by measuring signal strength during a series of transmission intervals of the signal corresponding to the transition intervals for the at least one sequence of channels among the plurality of sequences;

estimating a signal to noise ratio by correspondingly subtracting the signal strength measured during each of the series of transition intervals from the signal strength measured during each of the series of transmission intervals and dividing a result of such subtraction by the signal strength measured during each of the series of transition intervals; and optimizing the code rate and data rate used for scheduled transmissions from the at least one of a plurality of subscriber units to the spread spectrum communication system using the signal to noise ratio estimation.

6. The method of claim 5, wherein the method further comprises the step of computing an average noise and interference level for the at least one sequence of channels.

7. The method of claim 6, wherein the method further comprises the step of ranking the at least one sequence of channels among the plurality of sequences based on the computed average noise and interference level computed.

8. The method of claim 7, wherein the method further comprises the step of assigning a best available sequence among the plurality of sequences ranked to a particular subscriber unit.

9. A controller in a frequency hopped spread spectrum system operating to assign a best available frequency hopping sequence among a plurality of sequences to at least one of a plurality of subscriber units in a spread spectrum communication system having predefined transmission intervals and predefined transition intervals, the controller comprising:

an input that receives measurements taken at a base receiver that estimates a combination of a noise level and an interference level by measuring signal strength during a series of transition intervals for at least one sequence of channels among the plurality of sequences; and a processor that computes an average noise and interference level for the at least one sequence of channels and ranks the at least one sequence of channels in accordance with the average noise and interference level computed.

10. The controller of claim 9, wherein the processor chooses a best available sequence of channels with a lowest average noise and interference level among the plurality of sequences ranked for use in a next transmission of information in the spread spectrum communication system.

11. The controller of claim 9, wherein a power detector further estimates a combination of a signal, a noise and an interference level by measuring signal strength during a series of transmission intervals of the signal for the at least one sequence of channels among the plurality of sequences.

12. The controller of claim 11, wherein the processor further estimates a signal to noise ratio by correspondingly subtracting the signal strength measured during each of the series of transition intervals from the signal strength measured during each of a series of transmission intervals and dividing a result of such subtraction by the signal strength measured during each of the series of transition intervals.

13. The controller of claim 12, wherein the processor further chooses an optimized code rate and data rate for scheduled transmissions from the at least one of a plurality of subscriber units to the frequency hopped spread spectrum system based on the signal to noise ratio estimation.

14. A controller system in a frequency hopped spread spectrum system operating to assign a best available frequency hopping sequence among a plurality of sequences to at least one of a plurality of subscriber units in a spread spectrum communication system having predefined transmission intervals and predefined transition intervals, the controller system comprising:

a base receiver having a power detector that estimates a combination of a noise level and an interference level by measuring signal strength during a series of transition intervals for at least one sequence of channels among the plurality of sequences; and a processor that computes an average noise and interference level for the at least one sequence of channels and ranks the at least one sequence of channels in accordance with the average noise and interference level computed.

15. The controller system of claim 14, wherein the processor chooses a best available sequence of channels with a lowest average noise and interference level among the plurality of sequences ranked for use in a next transmission of information in the spread spectrum communication system.

16. The controller system of claim 14, wherein the power detector further estimates a combination of a signal, a noise and an interference level by measuring signal strength during a series of transmission intervals of the signal for the at least one sequence of channels among the plurality of sequences.

17. The controller system of claim 16, wherein the processor further estimates a signal to noise ratio by correspondingly subtracting the signal strength measured during each of the series of transition intervals from the signal strength measured during each of a series of transmission intervals and dividing a result of such subtraction by the signal strength measured during each of the series of transition intervals.

18. The controller system of claim 17, wherein the processor further chooses an optimized code rate and data rate for scheduled transmissions from the at least one of a plurality of subscriber units to the frequency hopped spread spectrum system based on the signal to noise ratio estimation.

19. A base receiver in a frequency hopped spread spectrum system operating to assign a best available frequency hopping sequence among a plurality of sequences to at least one of a plurality of subscriber units in a spread spectrum communication system having predefined transmission intervals and predefined transition intervals, the base receiver comprising:

a power detector that estimates a combination of a noise level and an interference level by measuring signal strength during a series of transition intervals for at least one sequence of channels among the plurality of sequences; and a processor that computes an average noise and interference level for the at least one sequence of channels and chooses the at least one sequence of channels having a lowest average noise and interference level for a next transmission of information in the spread spectrum communication system.

20. The base receiver of claim 19, wherein the power detector further estimates a combination of a signal, a noise and an interference level by measuring signal strength during a series of transmission intervals of the signal for the at least one sequence of channels among the plurality of sequences.

21. The base receiver of claim 20, wherein the processor further estimates a signal to noise ratio by correspondingly subtracting the signal strength measured during each of the series of transition intervals from the signal strength measured during each of a series of transmission intervals and dividing a result of such subtraction by the signal strength measured during each of the series of transition intervals.

22. The base receiver of claim 21, wherein the processor further chooses an optimized code rate and data rate for scheduled transmissions from the frequency hopped spread spectrum system to a subscriber unit based on the signal to noise ratio estimation.

23. The base receiver of claim 22, wherein the base receiver forwards information concerning a choice of the optimized code rate and data rate for scheduled transmissions from the frequency hopped spread spectrum system to a subscriber unit to a controller.

24. The base receiver of claim 19, wherein the base receiver forwards information concerning a choice of the at least one sequence of channels having the lowest average noise and interference level for the next transmission of information to a controller within the spread spectrum communication system.

* * * * *